April 7, 1964   M. H. HUGHES   3,128,087
GLIDE RIDE FOR AUTOMOBILES
Filed June 12, 1961
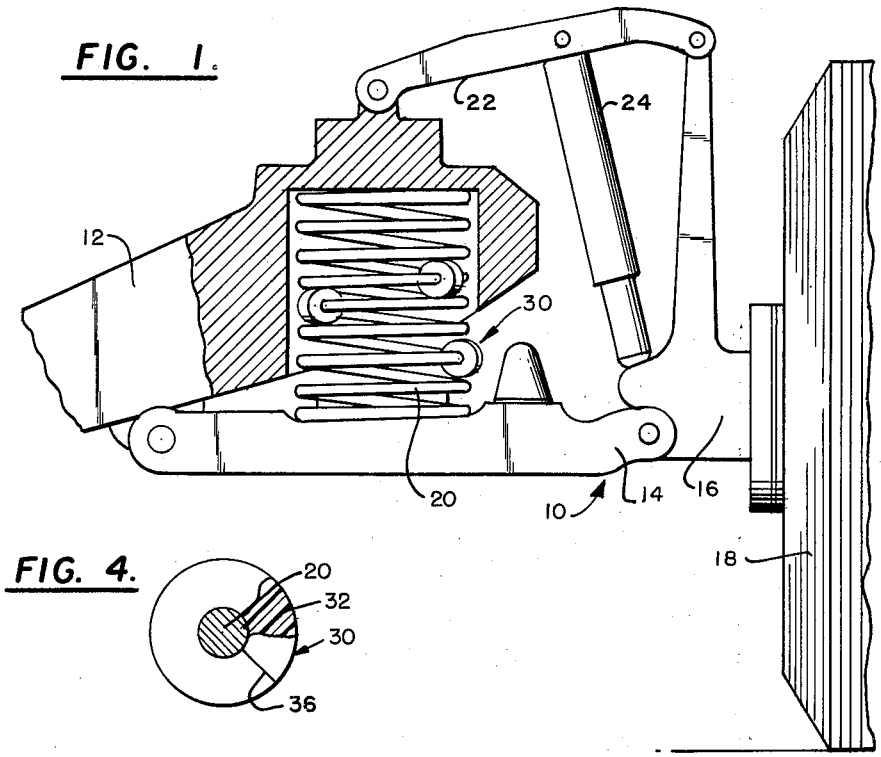
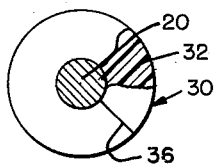
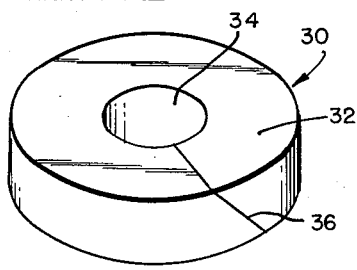
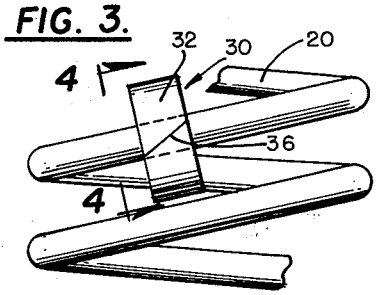
INVENTOR
Marshall H. Hughes 3,128,087
GLIDE RIDE FOR AUTOMOBILES
Marshall H. Hughes, 2414 Wedgewood Drive,
Wichita Falls, Tex.
Filed June 12, 1961, Ser. No. 116,389
2 Claims. (Cl. 267—33)

The present invention relates to vehicle structures and in particular to a stabilizer for a vehicle coil spring in the vehicle's frame or running gear.

An object of the present invention is to provide a better ride characteristic for a vehicle having coil spring suspension, and to prevent "bottoming" of the springs under adverse road conditions.

Another object of the present invention is to provide a spring stabilizer which engages the coils of a spring in such a way as to become a permanent part of the spring, and without chance of loss, even when the spring is unloaded or stretched.

A further object of the present invention is to provide a coil spring stabilizer which may be applied to either the front springs or rear springs of a vehicle.

Yet another object of the present invention is to provide a stabilizer for a vehicle coil spring which may be manufactured at reasonable cost, may be installed without tools, may be used in any number on each spring as desired, and one which is highly efficient in action.

These objects and advantages will be comprehended from the following description of a preferred form of the invention illustrated in the annexed drawing, in which:

FIG. 1 is an elevational view, partly in section, of a conventional vehicle coil spring suspension, showing three of the stabilizers of the present invention installed thereon, FIG. 2 is a perspective view of the stabilizer, on an enlarged scale, FIG. 3 is an elevational view of a part of a coil spring showing one stabilizer in place, and FIG. 4 is a view on line 4—4 of FIG. 3.

With reference to the drawing in detail, in FIG. 1 the numeral 10 designates generally a vehicle wheel suspension, including an axle 12, plate 14, wheel mount 16, and wheel 18.

A coil spring 20 has its lower end secured to or resting on the plate 14 and its upper end engaging the axle 12.

A link member 22 connects the wheel mount 16 to the axle 12, with the usual shock absorber 24 mounted between the member 22 and the mount 16 in the conventional manner.

The stabilizer of the present invention is designated by the numeral 30 and it consists in an annular body 32 having a hole 34 and a sloping cut 36 extending from the outer periphery to the hole 34.

The stabilizer 30 is mounted by springing it apart along the cut 36 and turning it so that a coil of the spring 20 may be received through the cut 36 into the hole 34, as in FIGS. 3 and 4.

The stabilizer body 32 is fabricated of a dense resilient rubber or other material having resilient strength and wear resistance. Preferably, the hole 34 is of a dimension to snugly receive the coil without either slipping on the coil or spring apart of the cut 36. This maintains the body 32 in place, and the diagonal cut prevents loss of the body 32.

In use, the body 32 is engaged by the adjacent coils of the spring when the load on the spring 20 is increased and is compressed by the adjacent coils. This added assistance to the spring 20 affords a more comfortable ride to the vehicle passengers and prevents bottoming of the spring 20 with the resultant jolt or hard bump. The device of the present invention may be used on new springs or springs which have aged and lost some of their resiliency.

The particular shape of the body 32 resists loss when the spring is unloaded or the vehicle body jacked up in such a way as to separate the coils of the spring.

What is claimed is:

1. An invention of the character described comprising, a tough, hard, resilient, annular body, the annular body being demarcated between its centrally located periphery and its external boundary and the coil of a spring snugly passing through the center of the said annular body thereby providing an auto glide for automobiles.

2. An invention of the character described, comprising a plurality of tough, hard, resilient, annular bodies, each of said annular bodies being diagonally demarcated between a centrally located opening and the external boundary thereof, and a coil of a coil spring snugly passing through each centrally located opening of each said annular bodies, each said annular body being in equal and radially spaced relation to one another on the said spring thereby providing an auto glide for automobiles.

References Cited in the file of this patent
UNITED STATES PATENTS

| | | |
|---|---|---|
| 239,111 | O'Mera | Mar. 22, 1881 |
| 1,119,803 | Brown | Dec. 8, 1914 |
| 1,998,892 | Braden | Apr. 23, 1935 |
| 2,202,899 | Colwell | June 4, 1940 |
| 2,807,511 | Fleming | Sept. 24, 1957 |
| 2,877,071 | Arnet | Mar. 10, 1959 |

FOREIGN PATENTS

| | | |
|---|---|---|
| 1,227,604 | France | Mar. 7, 1960 |